United States Patent
Yang et al.

(10) Patent No.: US 10,417,219 B1
(45) Date of Patent: Sep. 17, 2019

(54) DATA SHARING METHOD BASED ON PLURALITY OF BLOCKCHAINS

(71) Applicants: MACROGEN, INC., Seoul (KR); Macrogen Corp., Rockville, MD (US)

(72) Inventors: Sungwoo Yang, Bucheon-si (KR); Jaekyung Chon, Seoul (KR); Ik Jung Choi, Seoul (KR); Hyun Min Park, Seoul (KR); Jieun Park, Seoul (KR); Jeongsun Seo, Seoul (KR); Changhoon Kim, Gwangmyeong-si (KR); Hansol Seo, Yongin-si (KR); Namhee Kim, Seoul (KR)

(73) Assignees: MACROGEN, INC., Seoul (KR); Macrogen Corp., Rockville, MD (US)

( * ) Notice: Subject to any disclaimer, the term of this patent is extended or adjusted under 35 U.S.C. 154(b) by 0 days.

(21) Appl. No.: 16/222,332

(22) Filed: Dec. 17, 2018

(30) Foreign Application Priority Data

Mar. 28, 2018 (KR) ........................ 10-2018-0035570

(51) Int. Cl.
*G06F 17/30* (2006.01)
*G06F 16/23* (2019.01)
*H04L 9/06* (2006.01)

(52) U.S. Cl.
CPC ........ *G06F 16/2379* (2019.01); *H04L 9/0637* (2013.01); *H04L 9/0643* (2013.01); *H04L 2209/38* (2013.01)

(58) Field of Classification Search
CPC . G06F 16/2379; H04L 9/0643; H04L 9/0637; H04L 2209/38

USPC .......................................... 707/703
See application file for complete search history.

(56) References Cited

U.S. PATENT DOCUMENTS

| | | | |
|---|---|---|---|
| 9,794,074 | B2 * | 10/2017 | Toll ........................ G06Q 40/04 |
| 10,114,969 | B1 * | 10/2018 | Chaney ............... G06F 21/6218 |
| 10,135,609 | B2 * | 11/2018 | Bibera ................... G06Q 40/04 |
| 10,176,308 | B2 * | 1/2019 | Mintz .................. H04L 9/3236 |
| 2017/0046698 | A1 * | 2/2017 | Haldenby .......... G06Q 20/0655 |
| 2017/0228371 | A1 * | 8/2017 | Seger, II ............... G06F 16/215 |

(Continued)

FOREIGN PATENT DOCUMENTS

| | | |
|---|---|---|
| KR | 10-1720268 B1 | 3/2017 |
| KR | 10-1763827 B1 | 8/2017 |

(Continued)

OTHER PUBLICATIONS

Korean Office Action for related KR Application No. 10-2018-0035570 dated May 11, 2018 from Korean Patent Office.

(Continued)

*Primary Examiner* — Shiow-Jy Fan
(74) *Attorney, Agent, or Firm* — Paratus Law Group, PLLC

(57) ABSTRACT

Provided is a data sharing method based on a plurality of blockchains. The method includes registering, by a management server, user block data which includes user information and a hash key of each user of a plurality of users in a user information blockchain, receiving, by the management server, storage information of data provided by a first user from a storage server, and receiving, by the management server, a request for specific data from a second user and transmitting storage information of the specific data to the second user.

15 Claims, 11 Drawing Sheets

(56) References Cited

U.S. PATENT DOCUMENTS

2017/0344988 A1* 11/2017 Cusden ................ H04L 9/3247
2018/0204213 A1* 7/2018 Zappier ................ H04L 63/08

FOREIGN PATENT DOCUMENTS

| KR | 10-2018-0003113 A | 1/2018 |
| KR | 10-2018-0014534 A | 2/2018 |

OTHER PUBLICATIONS

Korean Notice of Allowance for related KR Application No. 10-2018-0035570 dated Aug. 23, 2018 from Korean Patent Office.

* cited by examiner

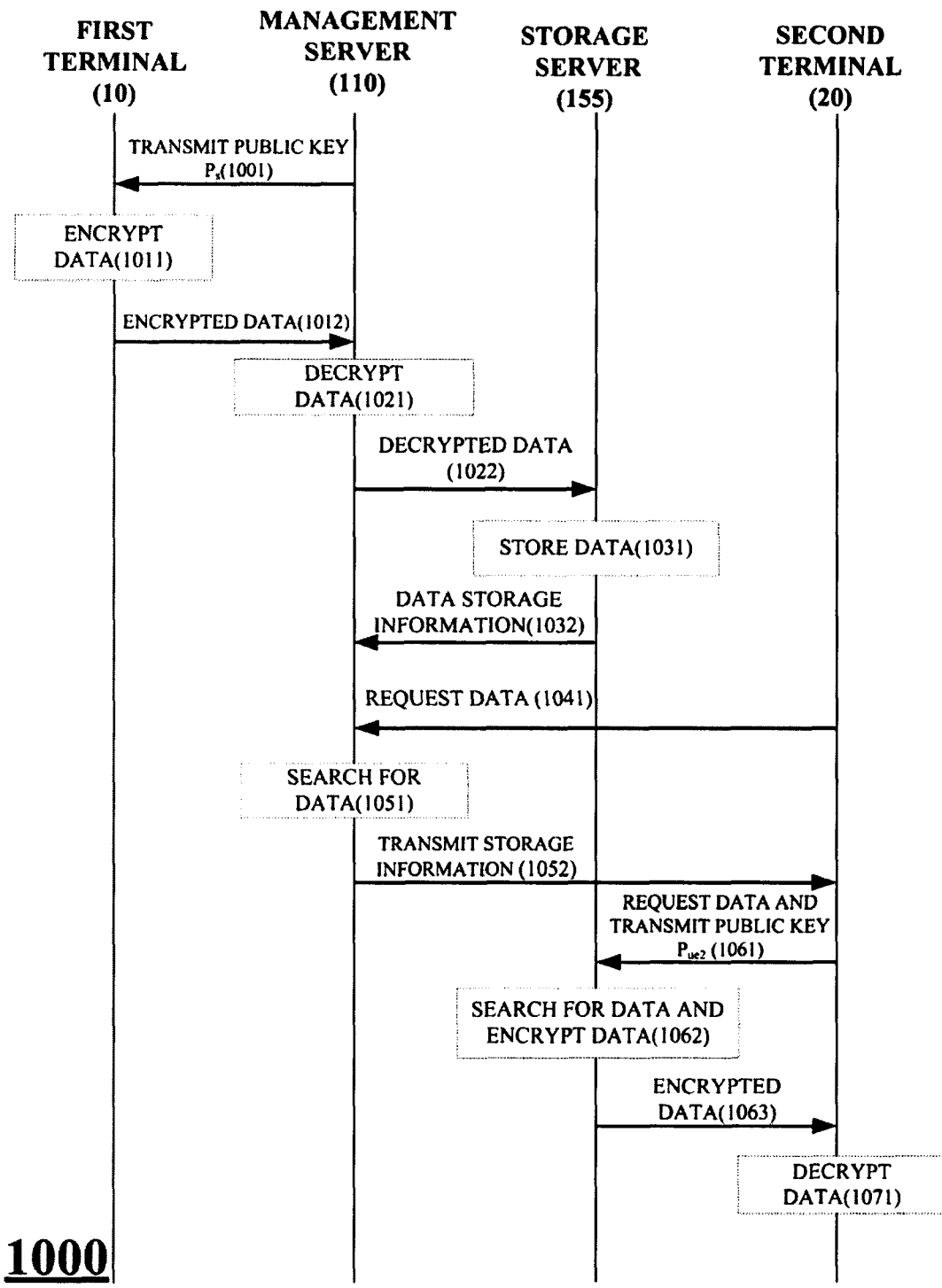

DATA SHARING METHOD BASED ON PLURALITY OF BLOCKCHAINS

CROSS-REFERENCE TO RELATED APPLICATION

This application claims the benefit under 35 USC 119(a) of Korean Patent Application No. 10-2018-0035570 filed on Mar. 28, 2018, in the Korean Intellectual Property Office, the entire disclosure of which is incorporated herein by reference for all purposes.

BACKGROUND

1. Field

The following description relates to a data sharing method based on a plurality of blockchains. The following description relates to a platform for data transaction relay and data sharing based on sharing economy, and more particularly, to a method of sharing data, which is owned by an individual, between subjects of a transaction, the method serving to integrate management as a transaction relay platform between a data provider and a data user.

2. Description of Related Art

As existing information and communication technology is combined with the recent paradigm shift from owning to sharing, digital information is increasing. For example, a sharing economy is spreading with the invigoration of peer-to-peer (P2P) transactions, which are interpersonal transactions for cooperative consumption.

The sharing economy is an economic model based on cooperative consumption, in which idle resources are not owned by an individual but shared among several subjects of transaction. The sharing economy is a transaction relay system between a resource provider and a resource user. On a sharing economy platform, a user pays a use fee for resources and uses as many resources as necessary, and a resource provider obtains a reward for idle resources that he or she has provided. Also, the platform which relays the transaction obtains a commission.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

When blockchain technology is applied to such a sharing economy, all participants may safely register, keep, and share idle resources together, solve security problems such as hacking and manipulation of idle resources, and also ensure the reliability of transaction records through verification.

Data may be composed of various kinds of information. For example, data may include specific genomic information, treatment information, and life information of various creatures including humans. Since the probability of a disease may be estimated from data of a human, it is possible to implement customized precision medicine for providing the most appropriate treatment to every patient. Among various kinds of data related to precision medicine, it may be very difficult to collect genomic information and treatment information of a specific group due to various loopholes of regulations and systems, high cost, time consumption, and the like. Also, life information is a record of unique lives, such as lifestyles and environments, which vary depending on individuals, and it may be difficult to collect life information unless individuals provide their information. Since personal data of individuals may be de-identified and then safely shared, these problems may be solved through a blockchain-based integrated data management platform on which a researcher and a research institution using personal data may obtain reliable data.

In other words, individuals are rewarded for providing and lending personal information and personal data, which is their idle resource, and data users obtain necessary data by paying use fees for necessary data such that a win-win economic system may be established. When researchers and institutions develop customized medicines and programs through various research results based on such idle resources, new medical science may be developed, and a burden to a society may be eased with a reduction in medical cost. Therefore, it is possible to create a high added value by enhancing public healthcare.

The following embodiments may accelerate data sharing and use by applying the blockchain technology to a sharing economy-based platform and may improve users' data accessibility and management efficiency by facilitating use of a public-domain software source. Also, the following embodiments may ensure security, reliability, and immediacy through a systematic security system capable of transparently and flexibly coping with the risk of hacking, an increase in the amount of data, and sharing when managing big data which is a large amount of integrated data. Further, the following embodiments may make it possible to construct an economic incentive system based on rewards and use fees such that participation of users may increase and a reduction in cost and time may be expected.

The following embodiments introduce the blockchain technology, thereby safely registering, keeping, and sharing data which is an idle resource shared among all participants, solving security problems of data hacking and manipulation, and providing a verification-based data transaction system and method.

The following embodiments provide a data sharing transaction system and method in which individuals are rewarded for providing and lending data, which is their idle resource, and data users obtain necessary data by paying use fees for necessary data such that both the individuals and the data users may benefit from the system and method.

The following embodiments provide a blockchain system and method in which a function is implemented through a blockchain so that a data owner may store and register data which is an idle resource in a shared storage server or delete data in the shared storage server personally or through an institution.

The following embodiments provide an integrated management system and method for blockchain-based shared data in which a borrower may search shared data for necessary data and receive the necessary data from a storage.

According to an embodiment of the disclosure, there is provided an integrated management method for data sharing, the method including: a) inputting, by users (including data owners/providers and data borrowers/users), basic information and registering the basic information in a personal information blockchain; b) storing, by a data provider, personal data in a data storage server and registering and deleting the personal data in data information and data blockchains; c) searching, by a data user, the data storage server for necessary personal data of a provider; d) paying, by the data user, a use fee for the necessary personal data of the provider and receiving the corresponding data from the data storage server; and e) transferring the use fee for shared genomic/medical information data to the data provider.

Operation a) may include: receiving identification information, such as names, birthdates, and email addresses, of the users as the basic information and registering the basic information in a user information blockchain; performing user authentication through the user information blockchain; and creating a virtual account through which it is possible to deposit and withdraw the use fee.

Operation b) may include: registering, by the data provider, meta information of the data in a metadata blockchain; personally transmitting, by the data provider, the data to the data storage server; and deleting, by the data provider, the personal data and information. Meanwhile, b) may include requesting, by the data provider, a data production company to transmit the data to the storage server.

Operation c) may include searching, by the data user, the metadata blockchain for meta information of the necessary data.

Operation d) may include: changing, by the data user, the use fee for the data into a virtual currency (e.g., points, membership mileage, or actual cash); registering the virtual currency in the virtual account through the information and data blockchain; and requesting, by the data user, the necessary data from the data storage server and receiving the necessary data.

Operation e) may include: transmitting the virtual currency to the virtual account registered in a genomic/medical information data blockchain and changing the received virtual currency into the use fee for the data.

BRIEF DESCRIPTION OF THE DRAWINGS

FIG. 11 shows another example of a sequence diagram of a data sharing process including an encryption process.

Figure 1:
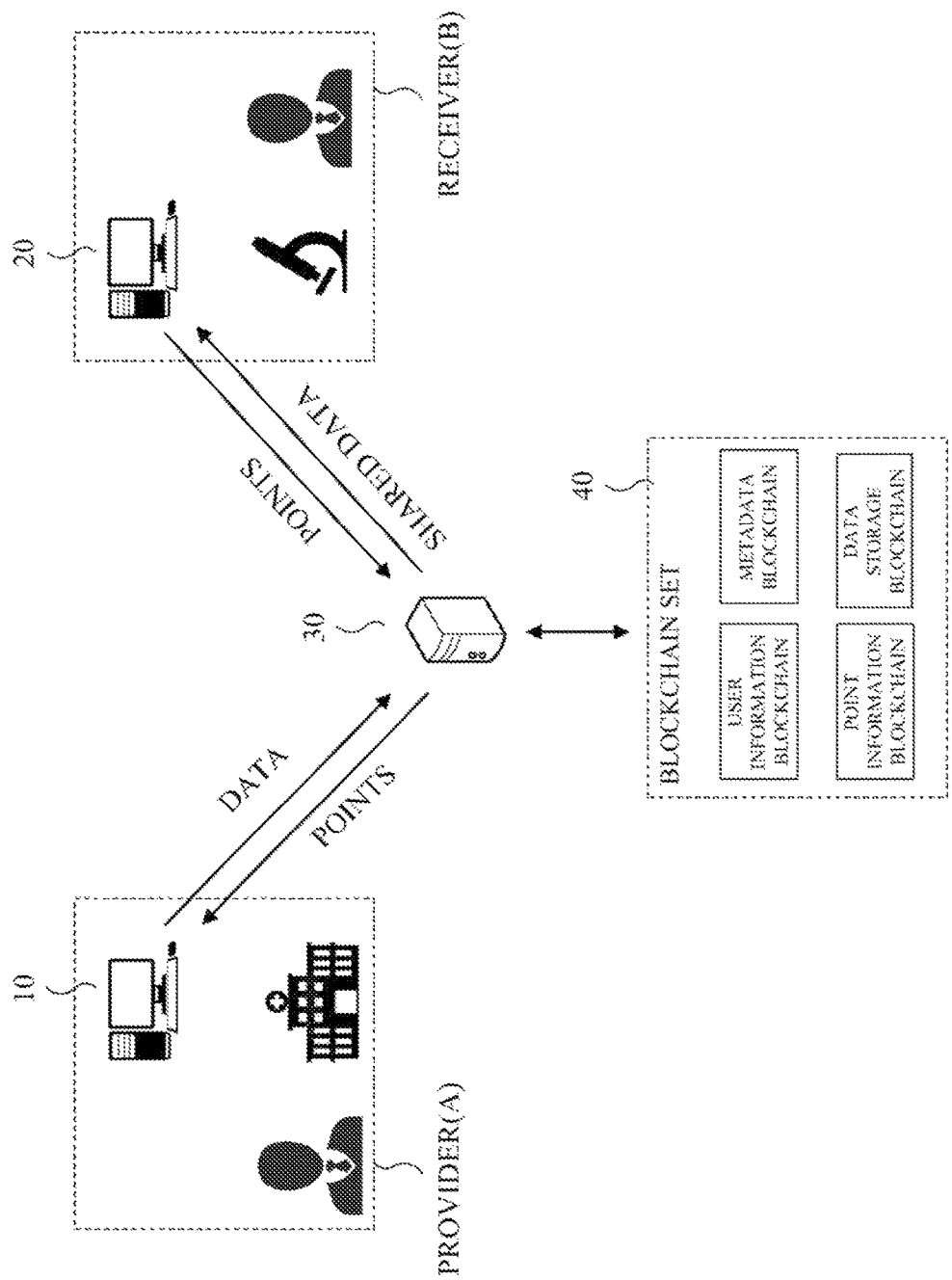
FIG. 1 shows an example of a data sharing model.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The technology described below is related to a data providing or sharing service. Although bio information data is described below, the following technology may be applied to various data providing services regardless of data type.

Terminology used in the description below will be described.

Genomic data indicates data obtained from a sample (specimen) of a specific user and a creature (a human, an animal, a microbe, etc.). For example, genomic data may include a base sequence, gene expression data, a genetic variation of standard genomic data, deoxyribonucleic acid (DNA) methylation, etc. obtained from DNA, ribonucleic acid (RNA), protein, etc. of a cell, a piece of tissue, and the like. In general, genomic data includes sequence information obtained by analyzing a specific specimen. Genomic data may be generally represented as digital data. This corresponds to sequence data obtained through next-generation sequencing (NGS) analysis equipment and the like.

Genome analysis data, or simply analysis data, indicates information obtained by analyzing genomic data. For example, analysis data includes diagnosis results, disease prediction results, disease risks, paternity test results, means of curing a disease, candidate materials for a new medicine, etc. acquired by analyzing genomic data.

Medical data indicates data which may be used to determine health conditions of a specific user (e.g., a patient). For example, medical data may include electronic medical record (EMR) data of a hospital. In other words, medical data may include examination results (clinical information) of medical equipment, diagnosis results of a medical staff, or the like. Also, for example, medical data may include medical image data and the like measured or captured by medical equipment. Further, for example, medical data may include bio signal data acquired by a mobile terminal (e.g., a healthcare device) capable of measuring bio signals.

Hereafter, data indicates a digital source including various pieces of information regardless of data format or type. Data may include personal information, information generated by an individual, information obtained by analyzing personal data, experimental data of an individual, and the like. For example, data may include at least one of the above-described genomic data, analysis data, and medical data. Data may be generated by each object (a person, a company, a research institute, a school, a hospital, etc.) which is a biological or social subject.

Metadata may be identification data derived from a data generation or manipulation process. Metadata corresponds to data for identifying or additionally describing data. Metadata may be a reference for searching for specific data. For example, metadata may include a genomic data format, a production methodology for genomic data, sequencing machine information, sample information, a definition in molecular biological technology, a production, results and statistics about data quality analysis, a production date, and the like. For example, metadata may include a production date, a production institution, patient information (an identifier and the like), disease information, an examination technique, a type of examination equipment, a data format, etc. of medical data.

A provider indicates a user who produces or processes data and provides the data. A provider may be a user who provides data so that the data may be shared. A provider may provide data that is personally produced by himself or herself or produced by another person.

A receiver indicates a user who receives data shared by a provider. A receiver may conduct research, analysis, etc. using data.

A user includes a specific subject such as a person or an institution. A user terminal or a terminal may be a computing device and indicates a client device used by a user. In a system, a user may be specified as a user terminal.

A computing device indicates a device which analyzes input source data using an arithmetic unit such as a central processing unit (CPU), application processor (AP), etc. A computing device generally includes an arithmetic unit, a memory, an input-output unit, a communication interface unit, and the like. A computing device may be implemented as a server, a personal computer (PC), a tablet PC, a smart phone, and the like.

A hash key may be a value used to identify a user in a blockchain network. A hash key may be generated in various ways. Representative hash key generation algorithms are MD5, SHA-256, and the like. A hash key may be a unique value for a specific user. A hash key may be a key composed of a string of a variable length.

A public key and an encryption key are keys for encrypting and transmitting data in a blockchain network. A public key and an encryption key are used for encryption known as public-key cryptography. A public key may be a key for encrypting data, and an encryption key may be a key for decrypting data. A public key and an encryption key may be paired with each other and may be randomly generated using various public key encryption methods (e.g., Rivest-Shamir-Adleman (RSA), elliptic curve cryptography, etc.).

A blockchain indicates a chain-link-based distributed data storage environment in which small pieces of data called "blocks" are generated in a peer-to-peer (P2P) manner from data to be managed. A blockchain network indicates a network component constituting a blockchain.

FIG. 1 shows an example of a data sharing model. FIG. 1 shows a user terminal 10 used by a provider A, a user terminal 20 used by a receiver B, a management server 30, and a blockchain set 40. For convenience of description, the user terminal used by the provider A and the user terminal used by the receiver B will be referred to as a first terminal 10 and a second terminal 20, respectively.

Data may be input to the first terminal 10. Otherwise, the first terminal 10 may generate data. Otherwise, the first terminal 10 may receive data from another object. The first terminal 10 transmits the data to the management server 30.

The management server 30 manages an overall process for data sharing. The management server 30 may be managed by a service provider of a data sharing service. It is possible to see that the management server 30 and the blockchain set 40 constitute a system for data sharing.

Data sharing may be performed through a blockchain. Data sharing employs a plurality of blockchains (a blockchain set). Respective blockchains of a blockchain set may be associated with different processes or functions for data sharing. The blockchain set 40 includes a user information blockchain, a point information blockchain, a metadata blockchain, and a data storage blockchain. Details thereof will be described below.

The management server 30 registers information on users in the user information blockchain in advance. The management server 30 may authenticate a specific user using the user information blockchain. The management server 30 registers metadata of the data received from the first terminal 10 in the metadata blockchain. The management server 30 builds the data storage blockchain by storing the data received from the first terminal 10 in a storage server. Also, the management server 30 manages point information of users (generation, use, transfer, discard, etc. of points) using the point information blockchain.

The management server 30 receives a request for data from the second terminal 20. The management server 30 may inquire about the requested data using metadata. In some cases, the management server 30 may inquire about data stored in the storage server. When the requested data exists, the management server 30 transmits storage information of the corresponding data to the second terminal 20. Subsequently, the second terminal 20 may receive the data from the storage server using the storage information.

A blockchain network has roughly two kinds of components. One element may be a blockchain node, and the other element may be a client. From a user's point of view, a node of a blockchain serves as a backend of a general service and a client of a blockchain serves as a client. When a client generates a new transaction, nodes share the transaction through a distributed consensus process and execute the transaction. The client may see results of the transaction. In FIG. 1, the user terminals 10 and 20 correspond to clients. In FIG. 1, blockchain nodes correspond to nodes connected to the network.

Figure 2:
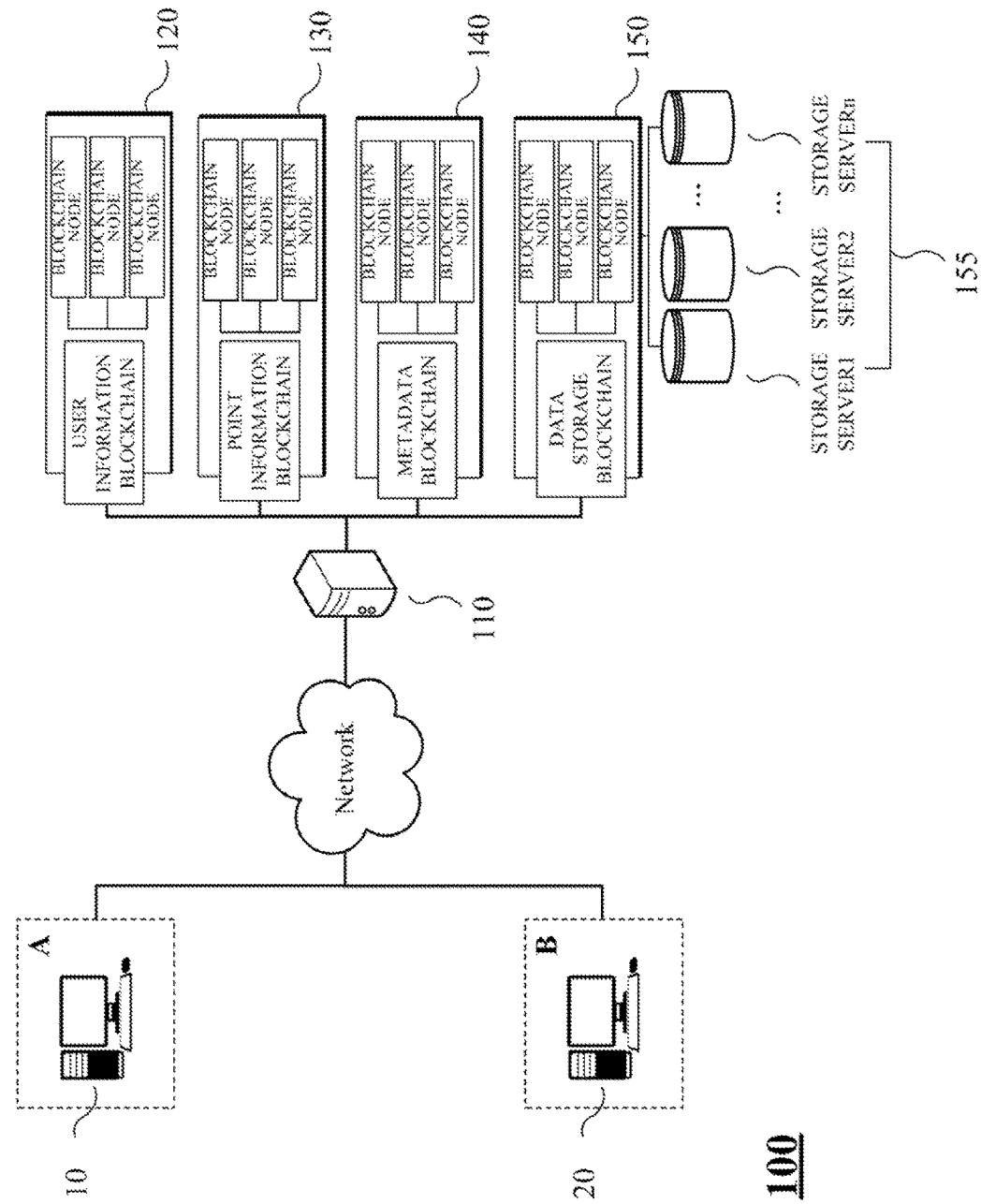
FIG. 2 shows an example of a data sharing system.

FIG. 2 shows an example of a data sharing system 100. The data sharing system 100 includes a management server 110 and a plurality of blockchains 120, 130, 140, and 150. The management server 110 corresponds to the management server 30 of FIG. 1.

User terminals include the first terminal 10 of a provider side and the second terminal 20 of a receiver side.

FIG. 2 shows a total of four blockchains 120 to 150. One blockchain may be composed of a plurality of blockchain nodes. The four blockchains are described below. In some cases, the system may further include a blockchain for another item, which will be described below.

The user information blockchain 120 has user information. The user information blockchain 120 stores a hash key for a user and user information. For example, the user information may include the user's identifier, identity (ID), contact information, email address, name, sex, affiliated institution, birthdate, and the like. The user information blockchain 120 may have user information encrypted with a public key.

The point information blockchain 130 has point information. Points may be incentives to data sharing. Also, points correspond to a use fee for data. Further, points may also be a commission for a data broker. Points may be a blockchain-based virtual currency. Alternatively, points may be a unique currency (a cyber money, cash, mileage, etc.) for a sharing service not based on a blockchain. Points may be changed into currency used in the real world through a separate system or service. The point information blockchain 130 has remaining point information, details of point transactions, etc. of an individual user.

The metadata blockchain 140 has metadata of data. The metadata blockchain 140 may have metadata encrypted with a specific public key.

The data storage blockchain 150 has storage information of data stored in a storage server. The storage information may include an identifier of the storage server, a file name, a position at which data is stored in a storage medium of the storage server, a file size, file split information, a verification key, and the like.

A storage server 155 stores data. The storage server 155 may be a single server. Alternatively, as shown in FIG. 2, the storage server 155 may include n servers storage server 1, . . . , and storage server n. When there are a plurality of storage servers, it is possible to store data in a distributed manner. Also, when there are a plurality of storage servers, one server (a primary storage server) may store generated data as it is, and other servers (secondary storage servers) may store the data in a distributed (divided) manner. When a plurality of servers are used, a plurality of storage servers or a plurality of secondary storage servers may be nodes constituting a blockchain such that the plurality of storage servers may constitute the blockchain. The data storage blockchain 150 has storage information of an entirety of holding data.

The management server 110 stores user information, point transaction information, metadata, and data in a blockchain network. The management server 110 serves to transmit data to the second terminal 20, which requests the data.

The management server 110 may have a user management function. In other words, the management server 110 may receive and store information on users in a user information blockchain network and perform user authentication on the basis of the stored user information.

The management server 110 may have a point management function. In other words, the management server 110 may store and inquire about details of users' point purchases or sales, details of point transactions accompanying inter-user transactions, remaining points of users, etc. through the blockchain network.

The management server 110 may have a metadata management function. The management server 110 stores metadata received from data providers in the blockchain network. The management server 110 may search for data on the basis of the metadata and create a group of data corresponding to search results.

The management server 110 may have a data storage management function. The management server 110 may receive data from providers, store the received data in the storage server 155, and transmit a group created by collecting data to a receiver.

Figure 3:
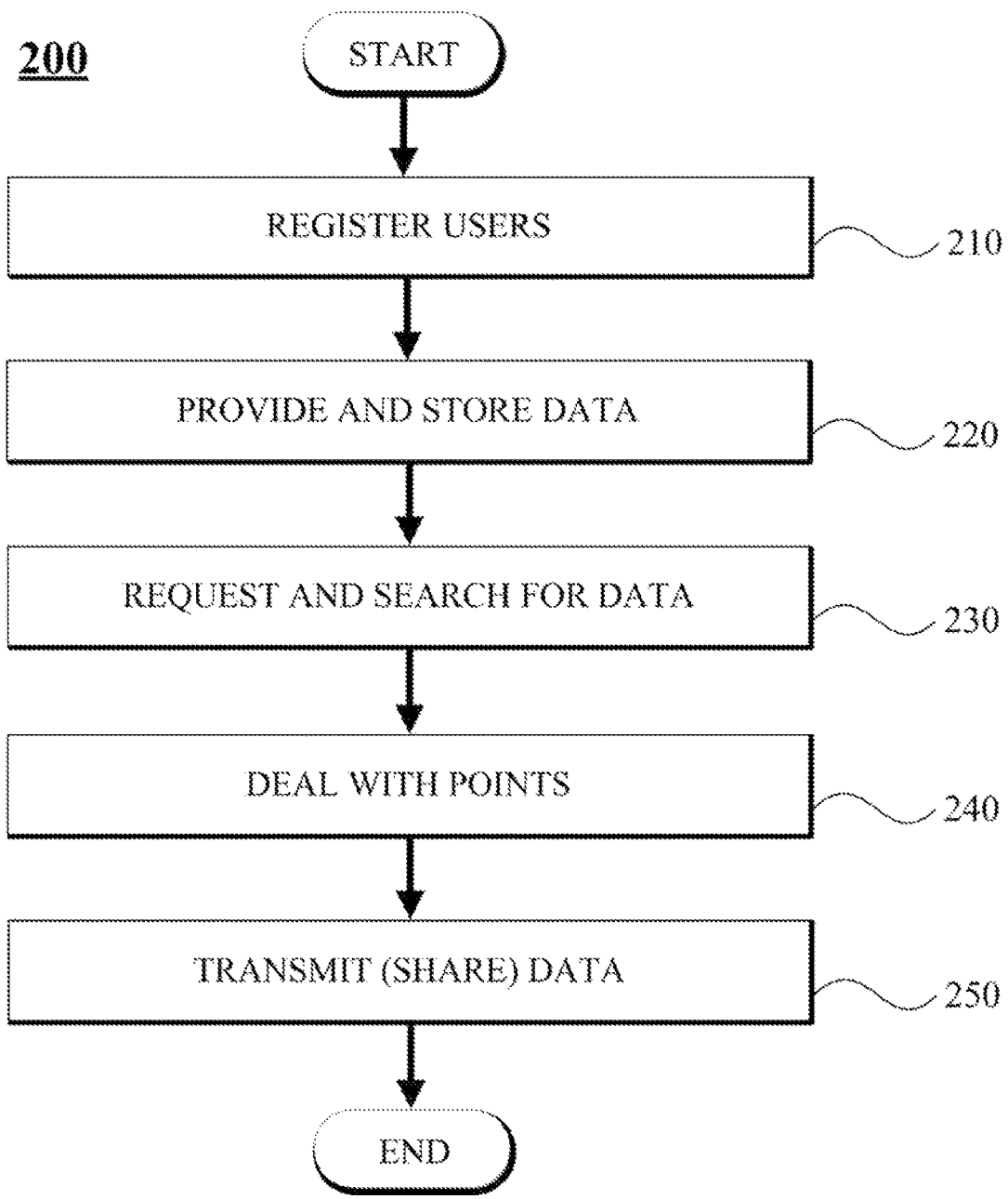
FIG. 3 shows an example of a flowchart of a data sharing process.

FIG. 3 shows an example of a flowchart of a data sharing process 200. FIG. 3 shows a schematic process for data sharing. Users (a provider and a receiver) perform user registration in advance (210). The management server 110 registers user information and hash keys in a user information blockchain. After user registration, the management server 110 may authenticate a user who performs or requests a data providing process, a data sharing process, a point dealing process, or the like before starting the corresponding process. The management server 110 may perform user authentication using the user information blockchain.

The provider provides data to the management server 110, and the management server 110 builds the data storage blockchain 150 while storing the data in the storage server 155 (220). Although not shown in FIG. 3, the management server 110 may register metadata of the data in the metadata blockchain 140.

The receiver requests necessary data to the management server 110. The management server 110 searches for the requested data (230). The management server 110 may search for the data using metadata.

Before providing the data to the receiver, the management server 110 deals with points related to data use (240). The management server 110 registers details of a point transaction (point change, point transfer, point purchase, etc.) in the point information blockchain 130. For example, receiver points may be transferred to the provider through this process.

Finally, the management server 110 provides the storage information of the requested data to the receiver. The receiver may receive the data from the storage server 155 using the storage information. The management server 110 would transmits (shares) the requested data to the receiver by providing the storage information of the requested data (250).

Meanwhile, data used in the process of user information registration, data storage, metadata registration, point dealing, etc. may be encrypted using a public-key method.

Figure 4:
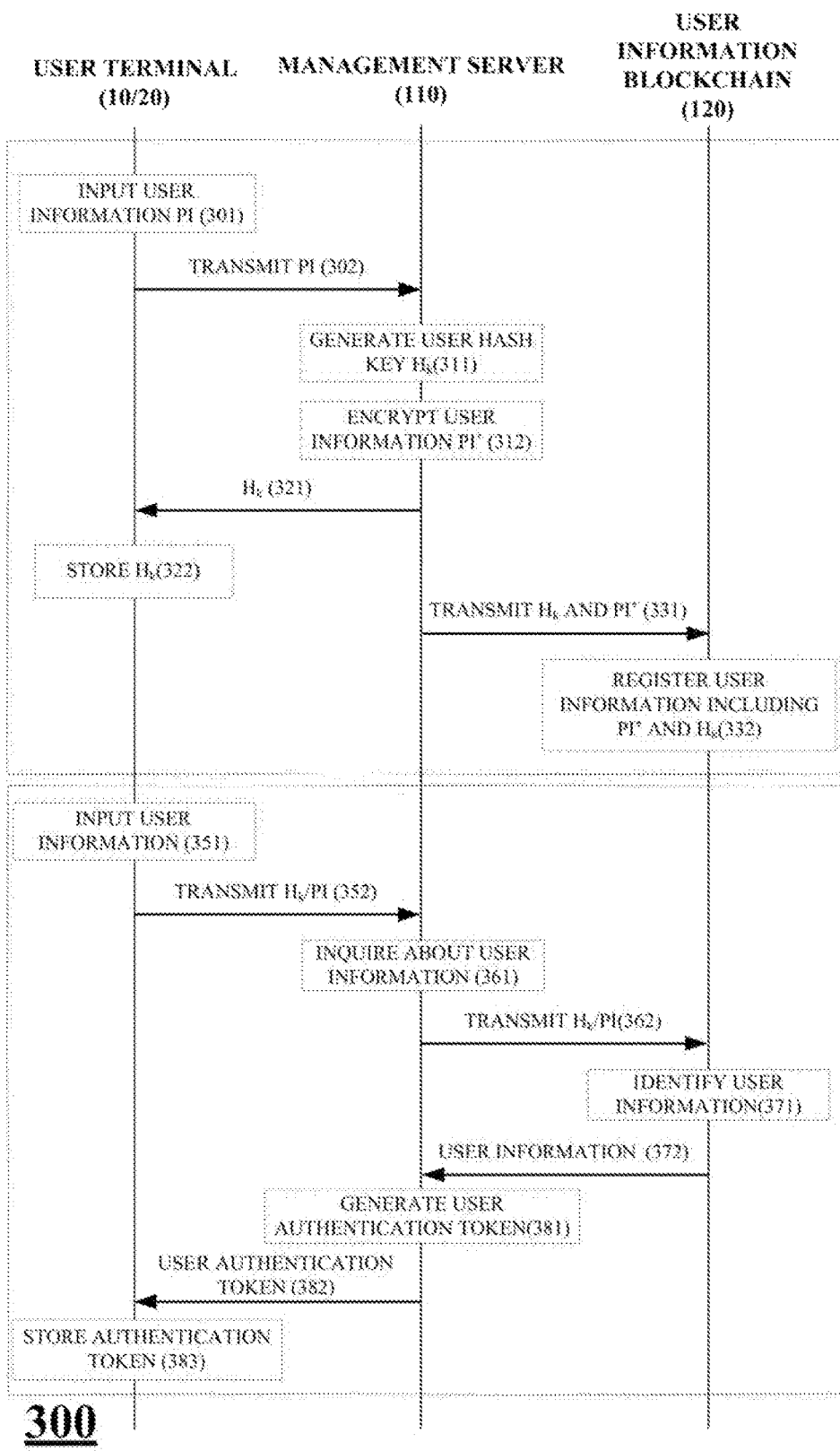
FIG. 4 shows an example of a sequence diagram of a user information registration and authentication process.

FIG. 4 shows an example of a sequence diagram of a user information registration and authentication process 300. FIG. 4 shows both a user registration process and a user authentication process.

A user registration process description follows. In FIG. 4, a user terminal indicates the first terminal 10 and/or the second terminal 20. A provider or a receiver may be required to perform user registration in advance so as to provide or request data.

User information PI may be input to the user terminal 10/20 (301). The user terminal 10/20 transmits the user information PI to the management server 110 (302).

The management server 110 may generate a hash key. The management server 110 generates a hash key $H_k$ for a user who has requested generation of a hash key using the user information PI (311). The hash key $H_k$ is used as an identifier of the user (the terminal) who has currently requested generation of a hash key. Therefore, the hash key $H_k$ corresponds to user-specific unique information. The management server 110 generates the hash key $H_k$ by inputting the input user information PI to a certain hash function. An algorithm or a hash function for generating a hash key may be varied.

The management server 110 may encrypt the received user information PI (to generate PI') (312). The management server 110 may encrypt the user information using a public key received from the user terminal 10/20. Meanwhile, the user terminal 10/20 may transmit user information PI' encrypted with the public key to the management server 110.

The management server 110 transfers the generated hash key $H_k$ to the user terminal 10/20 that has requested a hash key (321). The user terminal 10/20 stores the hash key $H_k$ in a storage medium (322).

The management server 110 transmits user block data including the encrypted user information PI' and the hash key $H_k$ to the user information blockchain 120 (331). The user information blockchain 120 registers the received encrypted user information PI' and hash key $H_k$ (332). Here, the management server 110 may additionally transmit the public key used for encryption to the user information blockchain 120. In this case, the user information blockchain 120 may additionally register the public key. The above-described operations 301 to 332 correspond to a user information registration process.

A user authentication process description follows. User authentication may be required for a specific operation or each operation of a data sharing service. Only a user who has gone through user authentication may be allowed to proceed with subsequent operations.

For authentication, the user information PI may be input to the user terminal 10/20 (351). The user terminal 10/20 transmits the user information PI or the stored hash key $H_k$ thereof to the management server 110 (352). The management server 110 may generate the encrypted user information PI' by encrypting the received user information with the public key. The management server 110 inquires about user information using the received user information PI (or PI') or hash key $H_k$ (361). The management server 110 inquires about user information transferred to the user information blockchain 120 using the received information. The management server 110 transmits acquired user information or the hash key $H_k$ to the user information blockchain 120 (362).

The user information blockchain 120 may identify user information on the basis of the received information (371). For example, the user information blockchain 120 may identify user information on the basis of the hash key $H_k$. The user information blockchain 120 transmits the identified user information to the management server 110 (372).

The management server 110 may perform user authentication by comparing user information PI' received from the user information blockchain 120 and the user information PI' received from the user terminal 10/20. Also, the management server 110 may generate an authentication token (381). Here, the management server 110 may encrypt the authentication token with the public key. The management server 110 transmits the user authentication token to the user terminal 10/20 (382).

The user terminal 10/20 stores the user authentication token (383). The user terminal 10/20 may decrypt the encrypted user authentication token and store the decrypted user authentication token. Subsequently, the user terminal 10/20 may use the authentication token in a process of communicating with the management server 110. The management server 110 which requires authentication may provide specific data only to a user terminal that transfers a valid authentication token.

In the user registration process, a virtual account creation operation may be performed for an individual user. Virtual account creation involves an operation of creating an account (a wallet) of the user in the point information blockchain 130. Virtual account creation may employ a method which is generally used in a blockchain-based virtual currency service. The following description of FIG. 5 is based on a situation in which user-specific virtual accounts have been created.

Figure 5:
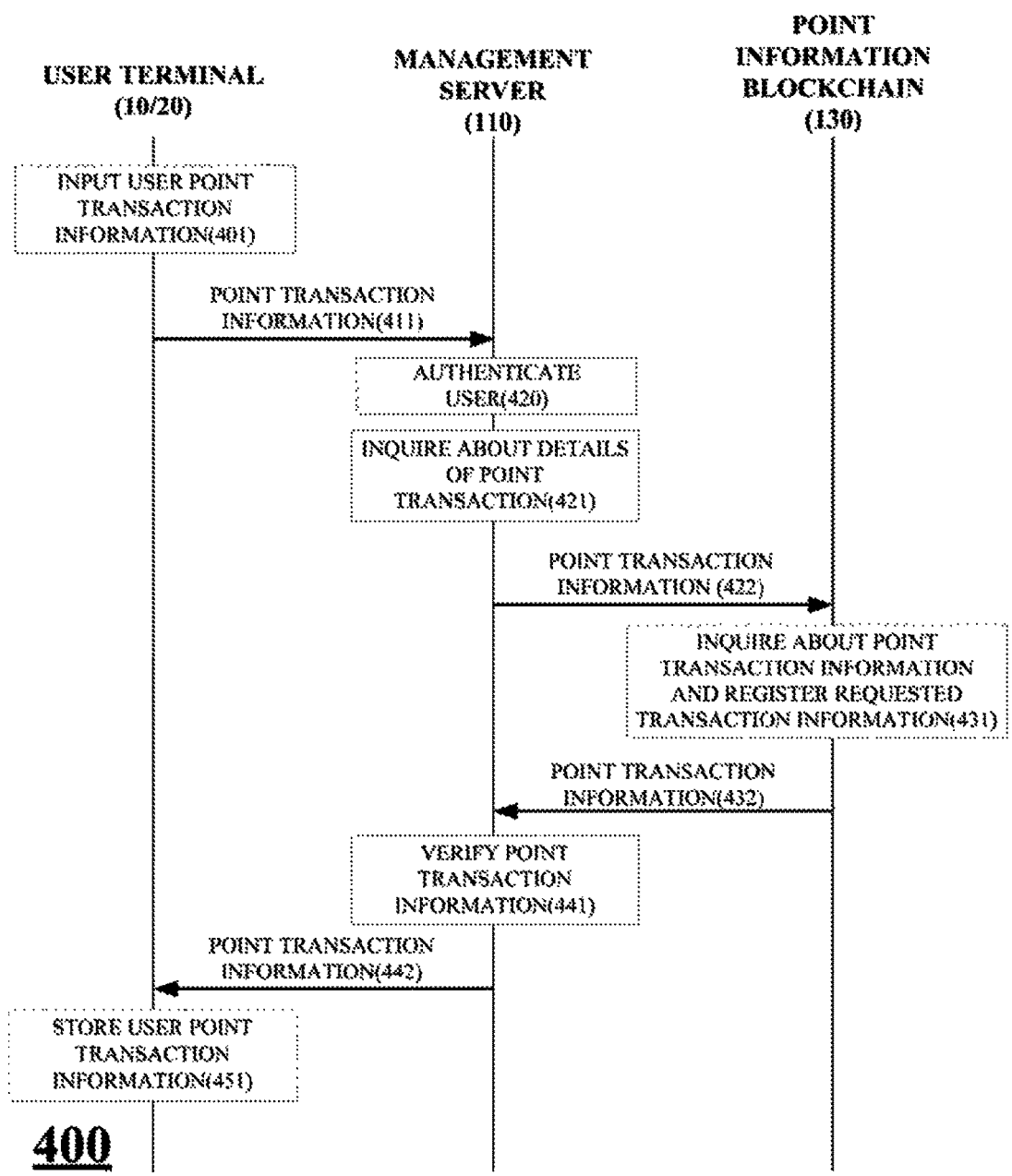
FIG. 5 shows an example of a sequence diagram of a point transaction process.

FIG. 5 shows an example of a sequence diagram of a point transaction process 400. FIG. 5 shows an example of a process of dealing with and managing a user's points.

User point transaction information may be input to the user terminal 10/20 (401). The point transaction information may include information required for a point transaction. For example, the point transaction information includes transaction counterparty information (user information or a hash key), purchased point information, information on point depositing and withdrawing, remaining point information, transaction amount information, and the like. The user terminal 10/20 transmits the point transaction information to the management server 110 (411). The user terminal 10/20 may encrypt the point transaction information with a public key and transmit the encrypted information.

The management server 110 may authenticate a user who has transmitted the point transaction information (420). The subsequent process may proceed only for a user who has gone through authentication. The management server 110 may authenticate the user using the authentication token received from the user terminal 10/20. The authentication token has been described above with reference to FIG. 4.

The management server 110 may inquire about details of the requested point transaction (421). For example, the management server 110 may inquire about a specific block corresponding to a ledger in which details of the transaction have been recorded. The management server 110 transmits the point transaction information to the confirmed point information blockchain 130 (422).

The point information blockchain 130 inquires about information on point transactions and registers the requested transaction information (431). For example, the point information blockchain 130 may reduce points from a ledger of a specific user (a receiver) and add points to a ledger of another user (a provider). The point information blockchain 130 records information related to the transaction details in the block. Then, the point information blockchain 130 transmits changed point transaction information to the management server 110 (432).

The management server 110 may verify whether the transaction information received from the point information blockchain 130 and the transaction information received from the user terminal 10/20 coincide with each other (441). When the verification is successful, the management server 110 transmits the changed point transaction information to the user terminal 10/20 (442). The user terminal 10/20 stores the changed user point transaction information (451).

Figure 6:
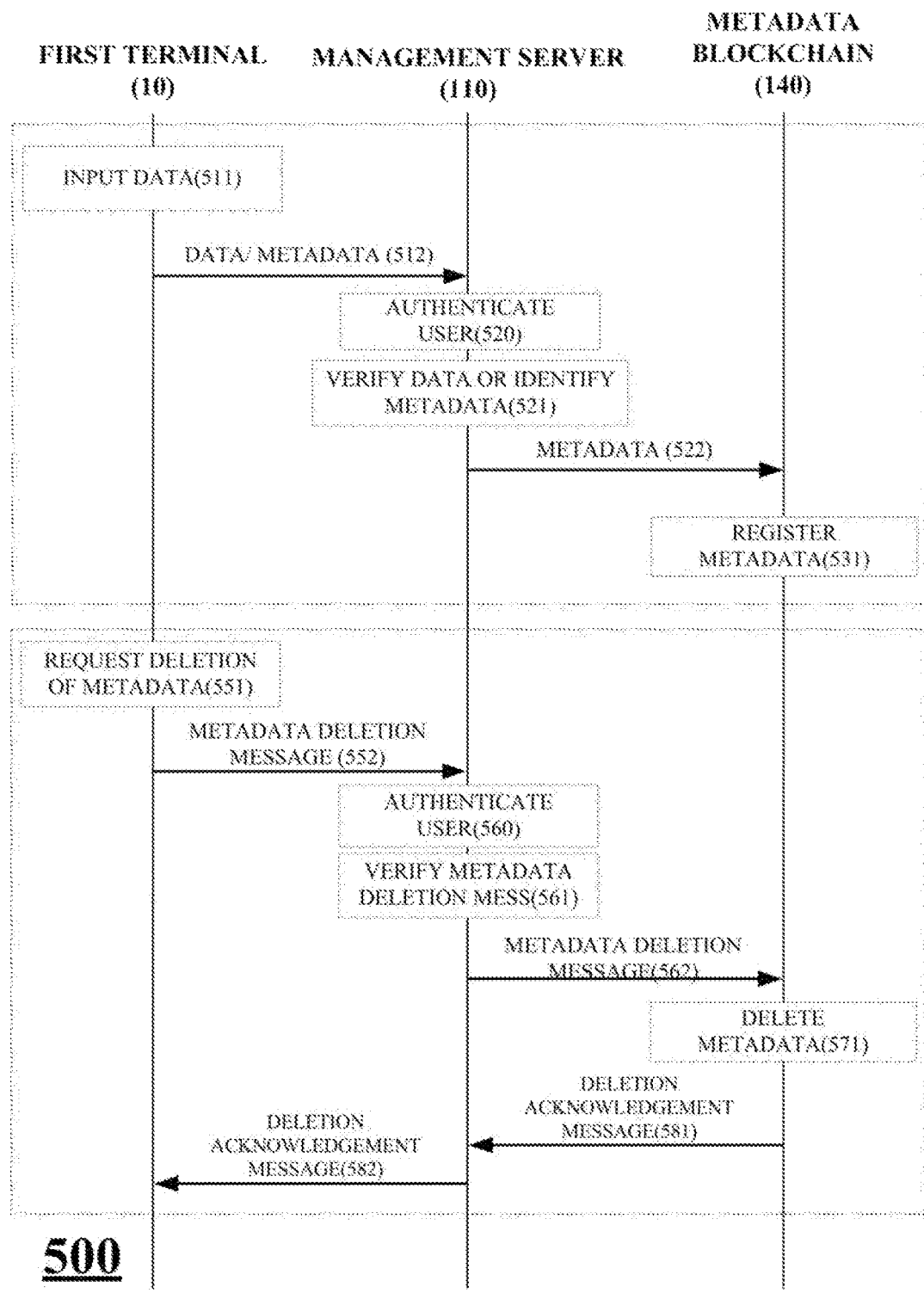
FIG. 6 shows an example of a sequence diagram of a process of managing metadata of data.

FIG. 6 shows an example of a sequence diagram of a process 500 of managing metadata of data. FIG. 6 includes a process of registering metadata and a process of deleting metadata.

First, the process of registering metadata is described. Data may be input to the first terminal 10 (511). Alternatively, metadata of data may be input to the user terminal 10/20. The first terminal 10 transmits the input or acquired data or metadata to the management server 110 (512).

The management server 110 may authenticate the user who has transmitted the data or the metadata (520). The subsequent process may proceed only for a user who has gone through authentication. The management server 110 may authenticate the user using the authentication token received from the user terminal 10/20. The authentication token has been described above with reference to FIG. 4.

When the data is received, the management server 110 may identify metadata from the data (521). When the data is received, the management server 110 may also verify whether the data conforms to a predetermined format or standard. Alternatively, the management server 110 may verify the data with a specific verification key. The verification key indicates information for verifying an electronic signature. In this case, the data is required to include an electronic signature in advance. The provider transmits the data including an electronic signature.

The data may include information on metadata in a specific format. In this case, the management server 110 may extract the metadata from the data. When the management server 110 directly receives metadata from the first terminal 10, no identification process is necessary. The management server 110 transmits the metadata to the metadata blockchain 140 (522). The metadata blockchain 140 registers the metadata related to the data as block data (531). When a receiver requests data, the metadata registered in the metadata blockchain 140 may be used to determine whether the requested data exists.

The process of deleting metadata is described. The first terminal 10 requests deletion of metadata (551). The first terminal 10 transmits a metadata deletion message to the management server 110 (552). The deletion message may include an identifier of the data, an identifier of the metadata to be deleted, a point of generation time of the metadata, and the like. Alternatively, the deletion message may include an entirety of metadata. The management server 110 verifies the received metadata deletion message (561). The management server 110 may verify the deletion message with a specific verification key. Separately from this, the management server 110 may authenticate the user who has transferred the deletion message (560). The authentication may be performed according to whether an authentication token transferred from the first terminal 10 is valid. The management server 110 transmits the deletion message to the metadata blockchain 140 (562). The metadata blockchain 140 deletes the metadata using information included in the deletion message (571). Subsequently, the metadata blockchain 140 transmits a deletion acknowledgement message to the management server 110 (581). The management server 110 may transmit the deletion acknowledgement message to the first terminal 10 (582).

Figure 7:
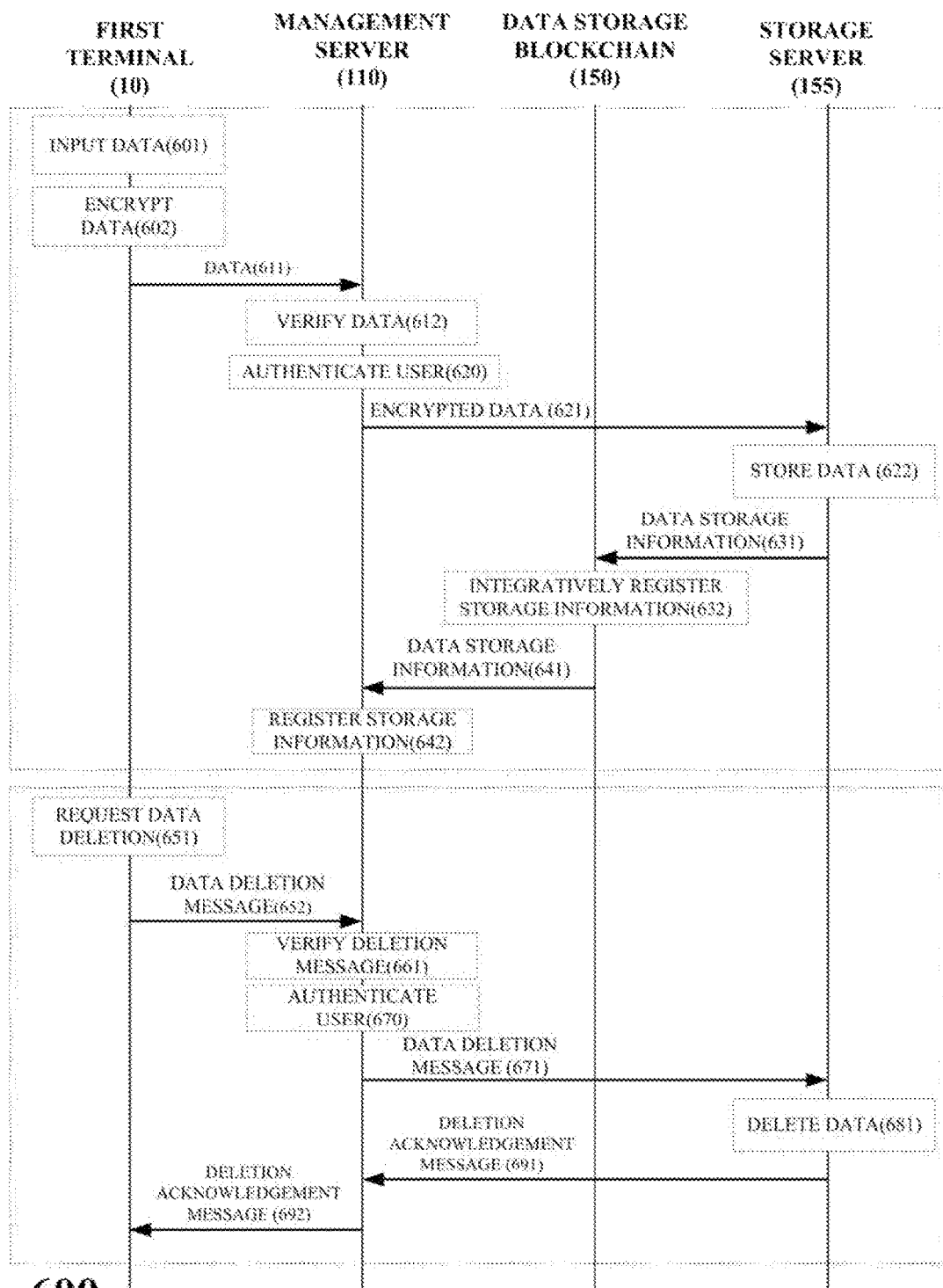
FIG. 7 shows an example of a sequence diagram of a data storage and deletion process.

FIG. 7 shows an example of a sequence diagram of a data storage and deletion process 600.

First, a data storage process is described. Data may be input to the first terminal 10 (601). The first terminal 10 may generate data by itself, or information generated by a third party may be input to the first terminal 10. The first terminal 10 may encrypt the generated data with a public key (602). In some cases, the management server 110 may encrypt the data with the public key of the first terminal 10.

The first terminal 10 transmits the data to the management server 110 (611). The management server 110 may verify the received data on the basis of certain criteria (612). For example, when the data has a specific format, the management server 110 may verify whether the data satisfies standards of the format. Alternatively, the management server 110 may verify the data using a verification key for the data.

The management server 110 may authenticate the user who has transmitted the data (620). The subsequent process may proceed only for a user who has gone through authentication. The management server 110 may authenticate the user using the authentication token received from the user terminal 10/20. The authentication token has been described above with reference to FIG. 4.

The management server 110 transmits the encrypted data to the storage server 155 (621). The storage server 155 stores the received data (622). As described above, the storage server 155 may include a plurality of servers. In this case, the data may be stored in the plurality of servers in a distributed or divided manner. One or more servers transfer their storage information of the data to the data storage blockchain 150 (631). The data storage blockchain 150 registers storage information of data stored in the storage server 155 in an integrated manner (632). While each storage server 155 has only information held therein, the data storage blockchain 150 has storage information of an entirety of data. As described above, storage information may include an identifier of a storage server, a file name, a position at which data is stored in a storage medium of the storage server, a file size, file split information, a verification key, and the like. The data storage blockchain 150 transmits the data storage information to the management server 110 (641). The management server 110 registers the storage information of the data (642). In other words, the management server 110 has storage information of the entirety of data.

A data deletion process is described. The first terminal 10 requests data deletion (651). The first terminal 10 transmits a data deletion message to the management server 110 (652). The management server 110 verifies the deletion message (661). The deletion message may include a name, an identifier, etc. of data to be deleted. The management server 110 may verify the deletion message using a verification key. Also, the management server 110 may authenticate the user (the first terminal 10) who has transmitted the deletion message through a separate process.

The management server 110 may authenticate the user who has transmitted the deletion message (670). The subsequent process may proceed only for a user who has gone through authentication. The management server 110 may authenticate the user using the authentication token received from the user terminal 10/20. The authentication token has been described above with reference to FIG. 4.

The management server 110 transmits the data deletion message to the storage server 155 (671). Since the management server 110 has the storage information, it is possible to transmit the deletion message to the storage server 155 storing the deletion target (671). The storage server 155 deletes the data requested to be deleted (681). Although not shown in FIG. 7, the storage server 155 deletes the data and registers changed information in the data storage blockchain 150. The data storage blockchain 150 updates the storage data. The storage server 155 transmits a deletion acknowledgement message to the management server 110 (691). The management server 110 may transmit the deletion acknowledgement message to the first terminal 10 (692).

Meanwhile, when the first terminal 10 deletes data, metadata of the deleted data may be deleted as well. Therefore, the deletion message transmitted by the first terminal 10 may include deletion information for data and metadata of the data.

Figure 8:
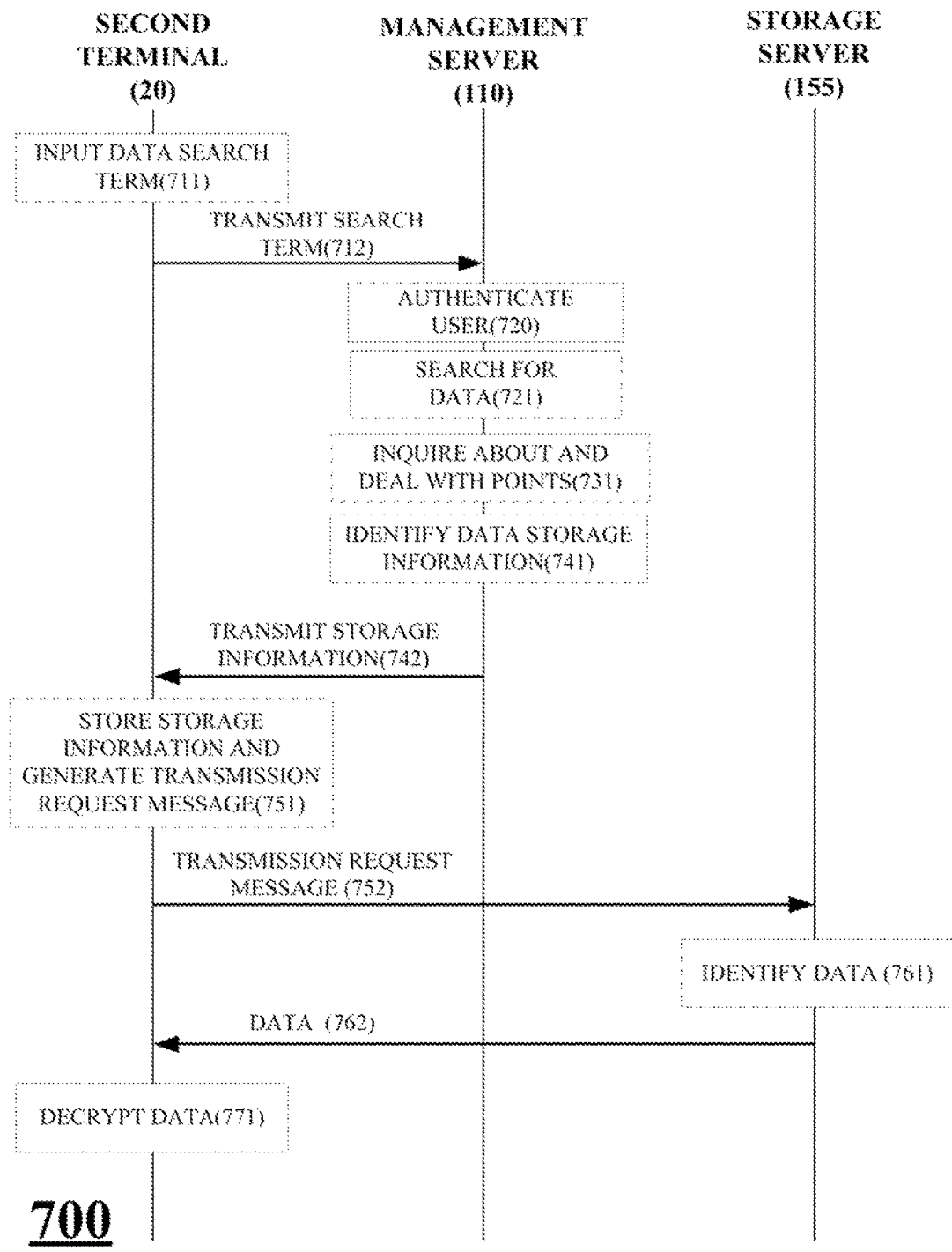
FIG. 8 shows an example of a sequence diagram of a data search and transmission process.

FIG. 8 shows an example of a sequence diagram of a data search and transmission process 700. FIG. 8 corresponds to a process in which a receiver receives shared data. A data search term may be input to the second terminal 20 (711). The data search term may be composed of various pieces of information. For example, the data search term may include an identifier of a specific target person, an identifier of a specific genome, an identifier of a specific disease, an identifier of a specific organ, a data generation time, a data update time, and the like. The data search term may include metadata of data. The second terminal 20 transmits the data search term to the management server 110 (712).

The management server 110 may authenticate the user who has transmitted the search term (720). The subsequent process may proceed only for a user who has gone through authentication. The management server 110 may authenticate the user using the authentication token received from the user terminal 10/20. The authentication token has been described above with reference to FIG. 4.

The management server 110 determines whether the requested data exists in the storage server 155 first (721). The management server 110 may determine whether the corresponding data exists in the storage server 155 using the information included in the search term. For example, the management server 110 may determine whether the corresponding data is currently in the storage server 155 using an identifier of the data. Further, the management server 110 may determine whether the corresponding data is in the metadata blockchain 140 using the metadata included in the search term. The management server 110 may search information in the metadata blockchain 140 using information, such as a data generation technique, a data generation time, and a specific disease type, and determine whether there is data satisfying the corresponding conditions.

When the requested data exists, the management server 110 inquires about points and deals with points (731). A point transaction has been described above with reference to FIG. 5. The management server 110 checks whether the receiver has points in the point information blockchain 130. When the receiver has remaining points corresponding to a reward for data sharing, the management server 110 reduces the receiver's points and increases a provider of the corresponding data. Also, the management server 110 may take some of the receiver's points to a manager's account as a commission for the data relay service.

The management server 110 identifies storage information of the requested data (741). Meanwhile, the management server 110 may identify multiple pieces of data which satisfy a search expression included in the search term and create one group with the pieces of data. In this case, the management server 110 identifies overall storage information of the pieces of data in the group. The management server 110 transmits the identified storage information to the second terminal 20 (742).

The second terminal 20 stores the received storage information and generates a transmission request message for requesting transmission from a corresponding storage server (751). The transmission request message may include an identifier (an address) of the storage server, the identifier of the data, a storage position of the data, and the like. The second terminal 20 transmits the transmission request message to the corresponding storage server 155 (752).

The storage server 155 identifies the requested data using the information included in the transmission request message and identifies data stored at a specific position (761). The storage server 155 transmits the identified data to the second terminal 20 (762). The second terminal 20 receives the data and decrypts the data with an encryption key (771). Therefore, the second terminal 20 may be required to acquire, in advance, the encryption key for decrypting the data which has been encrypted with a public key. To this end, the user information blockchain 120 may have the encryption key for a specific user. The second terminal 20 may acquire, in advance, the encryption key for the specific user through the management server 110.

Figure 9:
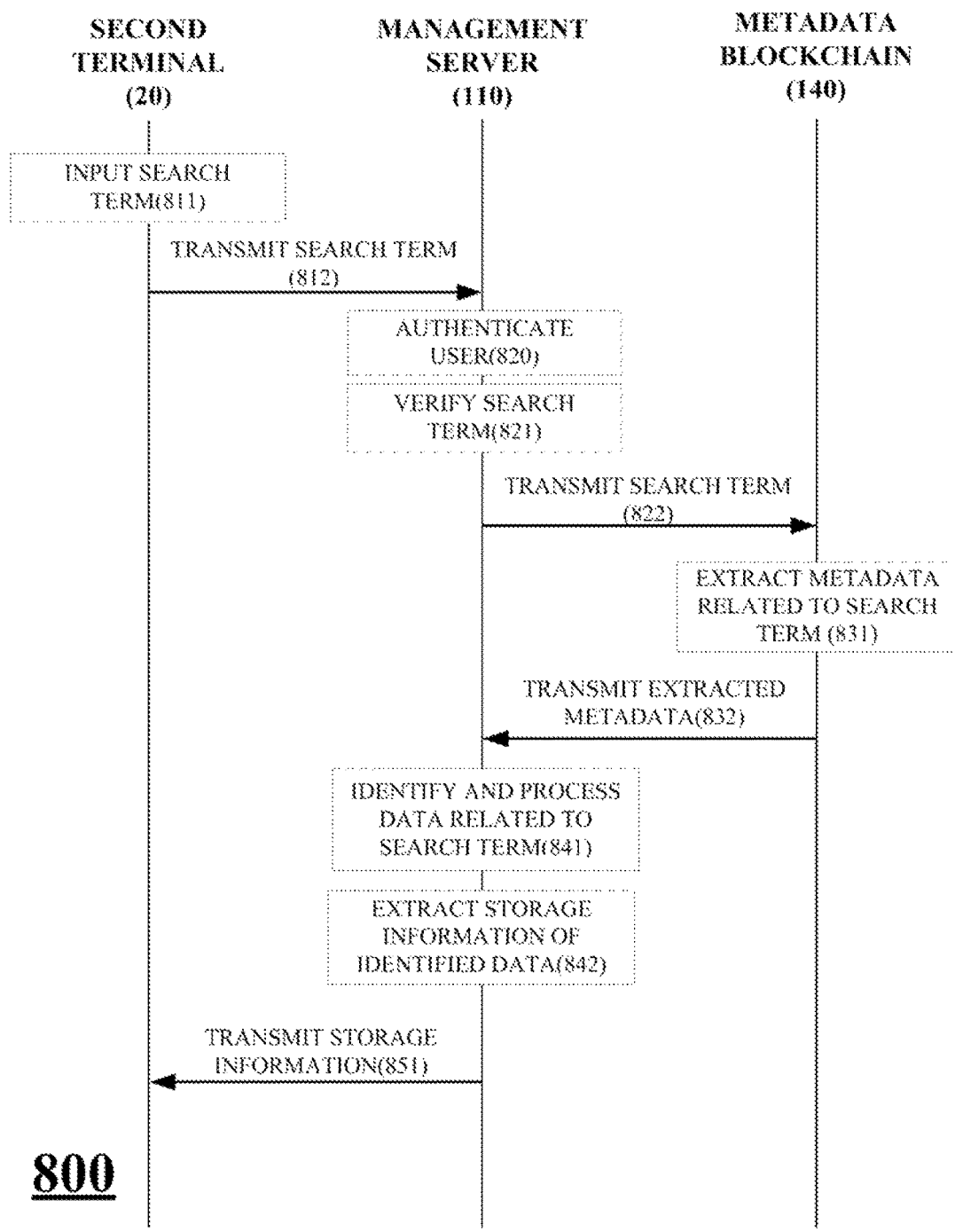
FIG. 9 shows an example of a sequence diagram of a process of identifying data on the basis of metadata.

FIG. 9 shows an example of a sequence diagram of a process of identifying data on the basis of metadata. If a receiver wants to receive data shared by a provider, the receiver requests the data which satisfies a condition to the management server 110. A search term may be input to the second terminal 20 (811). The second terminal 20 transmits the search term to the management server 110 (812). The search term includes information for identifying a specific kind of data wanted by the receiver. For example, the search term may include at least some of metadata of data.

The management server 110 may authenticate the user who has transmitted the search term as described above (820). Also, the management server 110 may verify the received search term using a verification key (821). Alternatively, the management server 110 may simply verify whether the search term is composed of a valid search term which conforms to a specific format. When the authentication and the verification are successful, the management server 110 transmits the search term to the metadata blockchain 140 (822).

The metadata blockchain 140 extracts metadata related to the received search term (831). The metadata blockchain 140 may extract all metadata including a specific piece of metadata. Then, the metadata blockchain 140 may transmit the extracted metadata to the management server 110 (832). The metadata may include an identifier of data.

The management server 110 may identify specific pieces of data in the received metadata. Also, when multiple pieces of data are related to the search term, the management server 110 may create one group with the pieces of data (841). The management server 110 extracts storage information of the identified one or more pieces of data (842). As described above, the management server 110 has storage information of data stored in the storage server 155. In some cases, a separate server or blockchain may manage the storage information.

The management server 110 transmits the identified storage information to the second terminal 20 (851).

Figure 10:
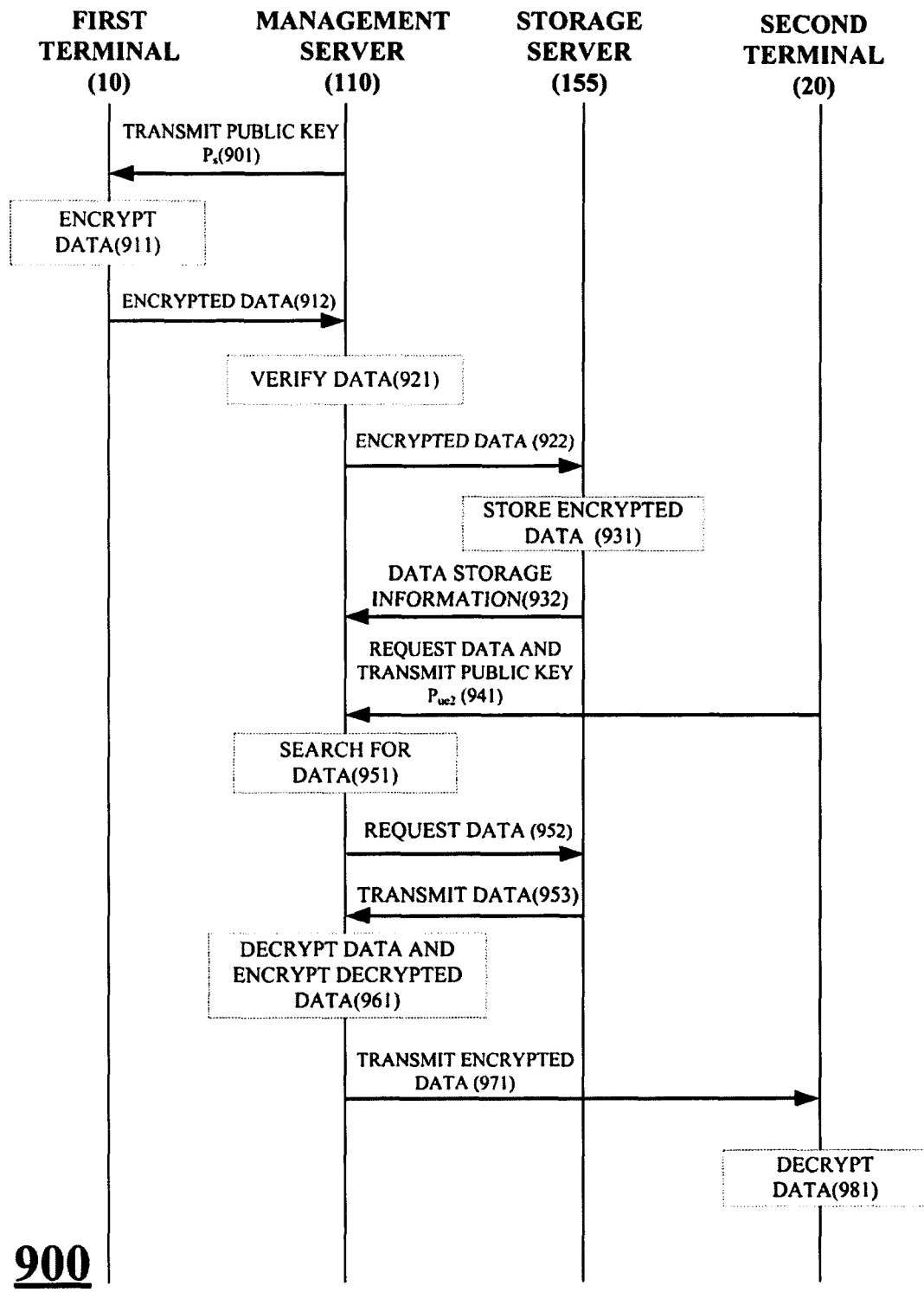
FIG. 10 shows an example of a sequence diagram of a data sharing process including an encryption process.

FIG. 10 shows an example of a sequence diagram of a data sharing process including an encryption process. FIG. 10 corresponds to a process in which the first terminal 10 provides data and the second terminal 20 receives the provided data.

The management server 110 transmits its own public key $P_s$ to the first terminal 10 (901). The first terminal 10 encrypts data using the public key $P_s$ (911). The first terminal 10 transmits the encrypted data to the management server 110 (912).

Unlike the process shown in FIG. 10, the management server 110 may encrypt the data transmitted from the first terminal 10 using its own public key and proceed with the subsequent process.

The management server 110 may verify the data using a verification key (921). The management server 110 transmits the encrypted data to the storage server 155 (922). One or more storage servers 155 store the encrypted data (931). As described above, a plurality of storage servers 155 may constitute the data storage blockchain 150. The storage servers 155 transmit storage information of the stored data to the management server 110 (932).

Subsequently, the second terminal 20 requests data of interest from the management server 110 (941). At this time, the second terminal 20 may transmit its own public key $P_{ue2}$ (941).

The management server 110 searches for the data through the above-described process (951). The management server 110 may request found data from the storage servers 155 (952). The storage servers 155 transmit the requested data to the management server 110 (953).

The management server 110 decrypts the received data with an encryption key corresponding to its public key $P_s$ and then may encrypt the decrypted data again with the public key $P_{ue2}$ of the second terminal (961). The management server 110 transmits the encrypted data to the second terminal 20 (971). The second terminal 20 decrypts the received data with its encryption key (981).

FIG. 11 shows another example of a sequence diagram of a data sharing process including an encryption process. FIG. 11 corresponds to a process in which the first terminal 10 provides data and the second terminal 20 receives the provided data.

The management server 110 transmits its own public key $P_s$ to the first terminal 10 (1001). The first terminal 10 encrypts data using the public key $P_s$ (1011). The first terminal 10 transmits the encrypted data to the management server 110 (1012).

The management server 110 may decrypt the received data with its encryption key (1021). The management server 110 transmits the decrypted data to the storage server 155 (1022). One or more storage servers 155 store the decrypted data (1031). As described above, a plurality of storage servers 155 may constitute the data storage blockchain 150. The storage servers 155 transmit storage information of the stored data to the management server 110 (1032).

Subsequently, the second terminal 20 requests data of interest from the management server 110 (1041). The management server 110 searches for the data through the above-described process (1051). The management server 110 transmits storage information of found data to the second terminal 20 (1052).

The second terminal 20 may request the specific data from the storage servers 155 using the storage information (1061). At this time, the second terminal 20 may transmit its public key $P_{ue2}$ to the storage servers 155 (1061).

The storage servers 155 may search for the requested data and encrypt the data with the public key $P_{ue2}$ (1062). The storage servers 155 transmit the encrypted data to the second terminal 20 (1063). The second terminal 20 may decrypt the received data with its encryption key (1071).

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A data sharing method based on a plurality of blockchains, the method comprising:
   registering, by a management server, user block data which includes user information and a hash key of each user of a plurality of users including a first user and a second user in a user information blockchain;
   receiving, by the management server, storage information of data provided by the first user from a storage server;
   registering, by the management server, metadata of the provided data in a metadata blockchain;
   receiving, by the management server, a request for specific data in the provided data from the second user;
   identifying, by the management server, the specific data based on a result of comparing information included in the request with the metadata in the metadata blockchain; and
   transmitting, by the management server, the storage information of the specific data to the second user,
   wherein the management server authenticates the first user and the second user using information stored in the user information blockchain, and transmits the storage information of the specific data when the authentication of the second user is successful, and
   wherein the storage information includes an identifier of a storage and a storage location of data in the storage.

2. The data sharing method of claim 1, wherein the identifying of the specific data comprises transferring, by the management server, at least one of pieces of information included in the request to the metadata blockchain to identify the specific data.

3. The data sharing method of claim 1, further comprising:
   registering, by the management server, details of a point transaction accompanying sharing of the specific data in a point information blockchain which manages points of the second user and points of the first user.

4. The data sharing method claim 1, wherein the storage information further includes at least one of an identifier of the provided data, a verification key, a file size, or file split information.

5. The data sharing method of claim 1, wherein the storage server is plural in number, and
   the plurality of storage servers constitute a data storage blockchain having the storage information of the provided data.

6. The data sharing method of claim 1, further comprising:
   authenticating, by the management server, a corresponding user by identifying the corresponding user in the user information blockchain using the user information of the first user or the second user; and
   transmitting, by the management server, an authentication token to the first user or the second user.

7. A data sharing method based on a plurality of blockchains, the method comprising:
   registering, by a management server, user block data which includes user information and a hash key of each user of a plurality of users including a first user and a second user in a user information blockchain;
   transferring, by the management server, data provided by the first user to a data storage blockchain composed of at least one storage server;
   receiving, by the management server, storage information of the provided data from the at least one storage server;
   receiving, by the management server, identification information of specific data from the second user;
   extracting, by the management server, storage information of the specific data among previously obtained storage information based on a result of comparing the identification information with metadata in a metadata blockchain; and
   transferring, by the management server, the extracted storage information to the second user,
   wherein the management server authenticates the first user and the second user using information stored in the user information blockchain, and transmits the storage information of the specific data when the authentication of the second user is successful, and
   wherein the storage information includes an identifier of a storage and a storage location of data in the storage.

8. The data sharing method of claim 7, wherein the registering of the user block data comprises receiving, by the management server, user information of each user of the plurality of users and generating a hash key using the received user information.

9. The data sharing method of claim 8, further comprising:
performing, by the management server, user authentication by comparing information stored in the user information blockchain and user information transmitted by the plurality of users.

10. The data sharing method of claim 7, further comprising:
registering, by the management server, metadata of the provided data in the metadata blockchain.

11. The data sharing method of claim 10, further comprising:
transferring, by the management server, information included in the identification information to the metadata blockchain to identify the specific data.

12. The data sharing method of claim 7, further comprising:
registering, by the management server, details of a point transaction accompanying sharing of the specific data in a point information blockchain which manages points of the plurality of users.

13. The data sharing method of claim 7, wherein the extracting of the storage information of the specific data comprises
identifying, by the management server, the metadata of the specific data which is received from the metadata blockchain in response to transmission of the identification information to the metadata blockchain, and
extracting the storage information of the specific data based on the metadata of the specific data.

14. The data sharing method of claim 7, further comprising:
receiving, by the second user, the specific data from the storage server using the storage information.

15. The data sharing method of claim 7, wherein the storage information further includes at least one of an identifier of the provided data, a verification key, a file size, or file split information.

* * * * *